United States Patent Office 3,309,225
Patented Mar. 14, 1967

3,309,225
PAPER COATED WITH ETHYLENE/HYDROXY-ALKYL VINYL ETHER INTERPOLYMERS
Harry P. Holladay, Creve Coeur, and John D. Calfee, Des Peres, Mo., assignors to Monsanto Company, St. Louis, Mo., a corporation of Delaware
No Drawing. Filed Mar. 29, 1963, Ser. No. 269,165
8 Claims. (Cl. 117—155)

The present invention relates to papers treated with interpolymers of hydroxyalkyl vinyl ethers and ethylene, and to method of treating papers with such interpolymers. The invention further relates to papers treated with blends of such interpolymers with waxes, and to the blends of such interpolymers with waxes.

The invention is particularly directed to papers coated with β-hydroxyethyl vinyl ether/ethylene copolymers, i.e., ethylene/vinyloxyethanol copolymers, especially with such relatively low molecular weight, solid waxy copolymers of fairly low vinyloxyethanol content. Vinyloxyethanol can copolymerize with ethylene in virtually any proportions and all such copolymers can be coated on paper. However, to achieve some of the purposes herein it is desirable to have the vinyloxyethanol polymerizate constitute from less than about 5% up to 30% or more by weight of the copolymer, or preferably, from about 7% by weight to 20 or 25% by weight, with about 8% to about 15%, e.g., 10% vinyloxyethanol by weight giving the best balance of properties. The copolymers will be solids and generally have number average molecular weight less than 5000 (as determined by osometric measurement), and melting points generally above 60° C. The number average molecular weights for melt coating procedures will ordinarily be in the range of 1000 to 10,000, normally about 2000 to 5000. However, for extrusion coating, higher molecular weights can be used, for example about 20,000 to 40,000 or higher number average molecular weights. The melting points in these molecular weight ranges wil vary somewhat with the vinyloxyethanol content, for example about 70 to about 90° C. for 20% vinyloxyethanol and about 85 or 90 to 105° C. for 10% vinyloxyethanol. In addition, it is desirable that the molecular weight distribution of the copolymer not be overly broad, for example that the ratio of the weight-average molecular weight to the number-average molecular weight be no greater than 10, and it is generally less than 5, for example about 3. It is also desirable that the copolymer have compositional uniformity and be free of acetal formation, cross-linking, gel content, etc. The lack of acetal content is indicated by having the hydroxyl groups correspond approximately to theoretical for the amount of vinyloxyethanol in the monomer, for example within 10%, i.e., to have the vinyloxyethanol content as determined by titration differ by less than 10% from that calculated from the carbon and hydrogen analysis.

In the present description and examples ethylene/vinyloxyethanol copolymer will for simplicity be utilized as an exemplification of the interpolymers of hydroxyalkyl vinyl ethers,, particularly those individually or in admixture with each other in which the alkyl group has 2 to 6 carbon atoms, and ethylene, and the statements concerning the exemplification apply generally to the referred-to class of interpolymers. Such monomers for example as 3-hydroxypropyl vinyl ether, 4-hydroxybutyl vinyl ether, 2-hydroxybutyl vinyl ether, 6-hydroxyhexyl vinyl ether and particularly other omega hydroxyalkyl vinyl ether copolymerize with ethylene to give copolymers of related properties. It will also be understood that the ethylene/vinyloxyethanol copolymers or related copolymers can if desired include a third polymerizable vinyl monomer, e.g., vinyl acetate, methyl acrylate, ethyl acrylate, methyl methacrylate, etc. Where reference is made herein to the monomer content of polymers, it will be understood that the reference is to the monomer in the form found in the polymer, i.e., as polymerizate (including copolymerizate).

Where hydroxyalkyl ether monomers in place of the vinyloxyethanol are employed in the copolymer with ethylene they will be employed in about the same mole percentages as the vinyloxyethanol, e.g., desirably about 2% to 12%, or often 3% to 6%, based on the total monomer content, for coating purposes, although other amounts can be employed as is the case with vinyloxyethanol.

As discussed further hereinbelow, it is usually desirable to keep the melt viscosity low for ease of application, but some compromise in this regard is often necessary as certain minimal molecular weights are advantageous for certain desired properties, and the molecular weight of course has a great influence on the melt viscosity. It is desirable to have a narrow molecular weight distribution as aforementioned for a broad distribution tends to increase melt viscosity without a corresponding increase in desirable properties of the coating as the lower molecular weight species are still present therein. The presence of acetal is objectionable in that it tends to cause cross-linking of the hot melt and to contribute to increased viscosity. Compositional uniformity is desirable to insure adequate free hydroxyl groups on each molecule in order to have good bonding to the paper.

The invention is further directed to coating papers with mixtures of blends of the foregoing interpolymers and waxes, and to the blends of interpolymers and waxes suitable for such coating.

In another aspect the invention concerns treating papers with interpolymers of hydroxylalkyl vinyl ether and, ethylene for the purpose of transparentizing in order to provide tracing papers, etc. In the past various waxes and resinous materials have been used for coating papers and paper board materials for various purposes. Some of these materials have been very suitable for some purposes but have had deficiencies in properties making them unsuitable for other purposes, and there has therefore been a need for improved coating materials of the type described herein. The interpolymers of β-hydroxyethyl vinyl ether and ethylene described herein have very high bonding strength, exceptional toughness, exceptional ink receptivity or printability, good grease resistance and acceptable resistance to moisture vapor transmission, and retain such properties at higher temperatures than suitable for employment for most of the common resinous or waxy coating materials.

Low molecular weight polyethylenes are frequently used for coating papers. While suitable in many respects, polyethylene does not form a very strong bond to paper and requires special treatment, such as by corona discharge, to be rendered ink receptive. Paraffin waxes are commonly used as a dip coating for many materials, such as milk cartons, where it is not necessary to have outstanding properties, but such waxes lack toughness and adhesiveness and are too low in melting point for many purposes. The coating properties of paraffin waxes are improved by addition of ethylene/vinyl acetate to improve adhesion. (Ethylene/vinyl acetate copolymers are generally too sticky for use alone.) Such improved waxes, while suitable for many purposes, do not have the high adhesivity of ethylene/vinyloxyethanol copolymer, and do not accept print; in fact, they are so deficient in this latter property that it is customary to apply the coating after the paper is printed rather than before, a procedure which is satisfactory for working with small work-pieces, but generally unsatisfactory when large work-pieces are involved.

The present invention is applicable to treatment of paper in general and is not limited to particular types of paper. Paper as used herein is intended to include paper board and other sheeted cellulosic materials as well as thin sheets of paper. Various types of paper known to the art can be coated by the present process, for example, papers obtained from kraft pulp, soda pulp, sulfite pulp, in bleached or unbleached forms, glassine paper, parchmentized paper, hard-textured or soft papers, bond, ledger, lithographic, wall and poster papers, wrapping papers, such as butcher's wrap, butter wrap, bread wrap, etc., untreated papers, papers sized with rosin or other sizing materials or treated with various finishes, papers filled with minerals or other fillers, and various non-woven sheeted materials known to the art.

The present invention contemplates the treatment of paper with the designated interpolymers whether by impregnation, sizing or coating, either before or after sheeting the cellulosic fibers into a paper. However, the invention is primarily concerned with surface-coating the preformed-paper, by procedures producing primarily a contiguous, hole-free polymer film bonded to the surface of the paper with only a limited amount of penetration or impregnation of the paper. The interpolymers can conveniently be applied to the surface of the paper by various hot-melt coating procedures. It is, of course, possible to simply brush or roll the melted interpolymer compositions onto the paper by hand, although it is rather difficult to obtain a uniform coating in this manner. The interpolymers described herein, e.g., ethylene/vinyloxyethanol copolymers, in hot melt form can be poured onto paper going through the nip of a pair of roll mills. In general the coatings according to the invention will most conveniently be applied by roll-coating procedures known to the art, e.g., by the squeeze-nip coater described in Hydrocarbon Resins in Paper Coatings, Industrial and Engineering Chemistry, vol. 53, No. 5, May 1961, pages 371 to 374, at page 372, the coater involving a pair of roll mills through which the paper is fed, the lower roll being immersed in the hot-melt. The reverse roll coater, gravure roll coater and pressure curtain coater described in the article can also be used, as can the extrusion coater there described, although the presently-employed interpolymers are not generally of sufficiently high molecular weight to require extrusion coating. The particulars of the preferable coating procedures depend to some extent upon the paper being coated, higher coating temperatures and provision for pressuring the polymer into the paper being preferable when the paper is non-absorbent such as is the case with parchment paper. The coating temperature will generally be well above the melting point of the coating material, which in the case of ethylene/vinyloxyethanol copolymers of preferred monomer ratio and molecular weight, means application temperatures of about 100 to 150° C., and often higher temperatures up to 200° C. or higher are advantageous. The treated paper can be after-treated by passing through further pressure roll mills, particularly heated roll mills, if desired.

The amount of polymer applied can vary depending upon the properties desired, but generally to obtain the desired toughness and degree of protection of the paper with low moisture transmission rate, the coatings will be applied in weights of about 6 to 18 or 20 lbs. per ream, usually about 10 to 15 lbs. per ream, or in general in amounts of 25% to 75% by weight of the paper, usually 40% to 65% by weight of the paper. In terms of thickness, coatings of 0.5 to 2 mils are often suitable.

It is generally desirable to incorporate an antioxidant or stabilizer in the polymer prior to melting, for example 2,6-di-tert-butyl paracresol (available under trademark Ionol), di(1-hydroxy-3-methyl-6-tert-butyl-phenyl)monosulfide (available under trademark Santowhite Crystals), or 4,4-butylidenebis(6-tert-butyl-m-cresol) (available under trademark Santowhite Powder), employing the materials in the usual stabilizing amounts.

The blends of interpolymers with waxes, e.g., ethylene/vinyloxyethanol copolymer and wax, can be applied to paper in the same manner as the interpolymers themselves, although lower melting points, depending upon the particular wax and amount of interpolymer employed, generally makes it possible to employ somewhat lower application temperatures, and low viscosity of the blends may make a dip procedure a convenient method of application. The amounts of the interpolymer and wax in the blend can vary considerably depending upon the properties desired in the coated paper. The beneficial adhesive properties of the interpolymers, e.g., ethylene/vinyloxyethanol copolymers, are more evident when the wax constitutes up to 25% or less by weight of the blend, although use of higher vinyloxyethanol content copolymers will tend to extend this range of wax content.

The interpolymers of $\beta$-hydroxyethyl vinyl ether and ethylene utilized herein can be obtained by following the general procedure set forth in U.S. Patent No. 3,025,267 to one of us, John D. Calfee, with due attention being given to obtaining the monomeric-ratio and molecular weight ranges desired. The interpolymers employed are preferably those which are relatively free from acetal, compositionally uniform, and of relatively narrow molecular weight distribution as prepared by the procedures taught in the S.N. 149,501, now abandoned, and S.N. 149,565, now Patent No. 3,252,952, of Oliver deS. Deex, both of which were filed on November 2, 1961. The preferred interpolymers are obtained by utilizing a pure hydroxyalkyl vinyl ether in the polymerization, e.g., vinyloxyethanol which is acid free and free from acetal groups, such as a recently distilled, carefully fractionated sample of vinyloxyethanol, and providing additional monomer during the polymerization to maintain a relatively constant monomer ratio, such as by maintaining constant ethylene pressure in a peroxide catalyzed polymerization at 70° to 120° C., and 3000 to 10,000 p.s.i.

The following examples are illustrative of the invention.

*Example 1*

A bread wrap paper was coated with ethylene/vinyloxyethanol copolymer by hot-melt application from a roll coater in an amount of 12.4 lbs./ream. A laminate of two pieces was then sealed at 140° C. The strength of the bond was then measured at various temperatures in comparison with a low molecular weight polyethylene, and a paraffin wax containing 20% by weight of ethylene/vinyl acetate copolymer, with results as reported below. The paraffin wax had been sealed at a lower temperature, 98° C., because of its lower melting point.

| Temperature, °C. | Bond Strength, Grams/Cm. | | Paraffin, E/VA |
| --- | --- | --- | --- |
| | Ethylene/ Vinyloxyethanol | Polyethylene | |
| −28 | Paper failure (125) | Paper failure (150) | 60.7 |
| 25 | Paper failure (107) | Paper failure (102) | 58.9 |
| 62 | Paper failure (79) | 4.5 | <1 |

The ethylene/vinyloxyethanol copolymer was then tested at higher temperatures, with a coating weight of 10.9 lbs. per ream.

Temperature, °C.

| | Bond strength, grams/Cm. |
| --- | --- |
| 68 | 10.7 |
| 74 | 5.4 |
| 79 | 2.9 |
| 90 | 1.8 |

It is thus demonstrated that the ethylene/vinyloxyethanol copolymer gave such a firm bond that at ordinary ambient temperatures the paper failed (at the force values in parentheses) before forces sufficient to break the bond were reached. At ordinary temperatures the ethylene/vinyloxyethanol copolymer bond was much stronger than that of the paraffin-ethylene/vinyl acetate blend, and at slightly elevated temperatures the ethylene/vinyl oxyethanol copolymer bond was stronger than the polyethylene bond. The ethylene/vinyloxyethanol copolymer employed in this example contained 10% by weight of vinyloxyethanol polymerizate.

*Example 2*

An ethylene/vinyloxyethanol copolymer of about 20% by weight vinyloxyethanol content was prepared by batch polymerization in a 1 gallon autoclave, utilizing acid-free vinyloxyethanol, at a pressure of 9500 p.s.i., and temperature of 130° C., with a reaction time of about 10½ hours. The initial monomer charge was about 61% by weight ethylene and 39% by weight vinyloxyethanol, with 0.076 mole percent of ditertiarybutyl peroxide catalyst based on the monomers and the pressure was maintained by addition of ethylene so that ethylene constituted about 71% of the total monomer charge. The conversion was about 45%, based on total charge. The relatively uniform acetal free copolymer containing 20% by weight vinyloxyethanol had a Brookfield viscosity of 3300 centipoises at 125° C. The copolymer was blended with two other samples of nearly the same composition to give an overall viscosity of 2500 centipoises and melting point of about 70° C., and coated on a bread-wrapper paper, an opaque sulfite paper, by pouring the hot melt into the nip of a roll mill through which the paper was passing, the rolls and melt being heated to about 115° C., and sealed into a laminate by a Palo Meyers sealer with 200 gram weight attached. The coating was applied at about 12 lbs./ream (24 inch x 36 inch x 500 sheets), and the coated paper was then sealed on the Palo Meyers sealer to uncoated specimens of paper at 98° C., 125° C., and 140° C., and the strength of the bonds was then tested on Instron Tensile Tester of Instron Engineering Corporation, and in every case the paper failed rather than the bond itself. (The sealing and testing were conducted as specified by Padgett et al. in Evaluation of Waxed-Paper Seals, from Palo Laboratory Supplies, Inc., 75 9th Ave., New York 11, N.Y., a reprint from Modern Packaging, February 1952, the tester and sealing instrument being described on the first and second pages thereof, and the procedure on the fourth page, particularly that part under "Laminating Strength.")

*Example 3*

An ethylene/vinyloxyethanol copolymer of 10% vinyloxyethanol content (as polymerizate) was prepared at 140° C., 9500 p.s.i., in a 9 hour reaction with ethylene constituting 80% of the initial monomer charge and 85.5% of the total charge, for a 45% conversion. Ditertiarybutyl peroxide catalyst constituted 0.033 mole percent of the original nonomer charged. Three products prepared under these conditions were blended together and the blend of 13,500 centipoise Brookfield viscosity, was coated on breadwrapper paper according to the procedure of Example 2 except that the hot melt and roll temperature was 125° C. Laminates were sealed and tested as in Example 2. The copolymer did not bond at 98° C., but when sealed at 125° C., and 140° C., the paper failed without breaking the bond.

*Example 4*

Ethylene/vinyloxyethanol of 90% ethylene and 10% vinyloxyethanol weight content was prepared in two runs at 9000–95000 p.s.i., 140° C., with ethylene constituting about 80% by weight of the initial monomer charge and 85.5% of the total monomer charge to give products of 8700 and 6800 centipoise viscosity, which were blended to obtain copolymers of 7700 centipoise viscosity at 125° C. Breadwrapper was coated with the copolymer according to the procedure and with the same test results as in Example 3.

*Example 5*

An ethylene/vinyloxyethanol copolymer containing 10% by weight vinyloxyethanol was obtained by polymerization at 9500 p.s.i., 130° C., for about 4 hours with a conversion of 35%, employing ditertiarybutyl peroxide in an amount of 0.076 mole percent of the initial monomers. Ethylene constituted about 78% by weight of the initial monomers and 85% of the total monomer charge. The copolymer, 29,600 poise viscosity, was blended with a similarly prepared copolymer of 32,100 poise viscosity, to give copolymer of 31,000 centipoise viscosity at 125° C., and a melting point of 98–102° C. The copolymer was coated on breadwrapper at about 12 lbs./ream utilizing a hot melt and roll temperature slightly above 150° C., and laminates were sealed and tested as in Example 3. Laminates sealed at either 125° C., or 140° C., exhibited paper failure rather than failure of the bond.

*Example 6*

Ethylene/vinyloxyethanol copolymer as described in Example 2 was roll coated on parchment paper in accordance with the procedure of that example, and a laminate was then sealed with a hand iron at 140° C., to give a bond of 31.3 grams/cm. A paraffin containing 20% by weight ethylene/vinyl acetate copolymer formed a 24.6 gram/cm. bond under the same conditions. The ethylene/vinyloxyethanol copolymer described in Example 5 when applied to parchment in accordance with that example and sealed with a hand iron at 140° C., formed a bond of 21.8 grams/cm., and when sealed with a Palo Meyers sealer with 700 gram weight, a bond of 25 grams/cm. The two ethylene/vinyloxyethanol copolymers were also successfully laminated to parchment on a Talboys coater at 350° F., giving bonds of the order of 50 grams/cm. compared to 32.7 for the paraffin containing ethylene/vinyl acetate copolymer, and 8.8 for a low molecular weight polyethylene.

*Example 7*

Ethylene/vinyloxyethanol copolymers prepared as described above were coated on parchment or breadwrapper in amount of about 12 lbs./ream and the coated surface was then stamped with ink, and the ink adhesion was then measured by determining the percentage of ink which could be lifted off with cellophane tape, both by slowly removing the tape, and by pulling it off fast. The results are reported below, along with for comparison results with a low molecular weight polyethylene, and a paraffin containing 20% by weight ethylene/vinyl acetate copolymer.

WAX COATING

| Identity | Vinyloxyethanol content, weight percent | Viscosity Centipoise | Paper | Ink lift, percent | |
|---|---|---|---|---|---|
| | | | | Slow | Fast |
| Ethylene/vinyloxyethanol | 20 | 2,500 | Parchment | None | 5-10 |
| Do | 20 | 2,500 | Breadwrapper | None | 10 |
| Do | 10 | 13,500 | Parchment | None | 30 |
| Do | 10 | 13,500 | ___do___ | None | 40 |
| Do | 10 | 7,700 | ___do___ | None | 40-45 |
| Do | 10 | 7,700 | Breadwrapper | None | 40-45 |
| Do | 10 | 31,000 | ___do___ | None | 50-55 |
| Do | 10 | 31,000 | ___do___ | None | 60 |
| Do | 10 | 18,000 | ___do___ | 50-60 | 70-80 |
| Polyethylene | | 18,000 | Parchment | 80 | 80 |
| Do | | 100 | ___do___ | 90 | 90 |
| Ethylene/vinyl acetate-paraffin | | 100 | Breadwrapper | 90-95 | 90-95 |

It can be seen that the ethylene/vinyloxyethanol copolymers have strikingly greater adhesion properties for ink and therefore paper and paper board materials coated with these copolymers offer a superior surface for printing labels and the like.

*Example 8*

Ethylene/vinyloxyethanol copolymers containing 10% and 20% by weight respectively of vinyloxyethanol were melt-coated on parchment and breadwrapper papers at 12 lbs./ream and the moisture transmission rate was measured (TAPPI Standards I-448 M-49 and T-465 SM-52). The 10% vinyloxyethanol copolymer of 31,000 centipoise viscosity had a relatively low rate of 4.6 to 9.7 grams/square meter/24 hours for flat and creased samples on the two papers. Comparison specimens coated respectively with low molecular weight polyethylene and a paraffin wax containing 20% by weight ethylene/vinyl acetate had better (lower) rates for the flat samples, but both had much poorer (higher) rates for the creased breadwrapper, and the polyethylene coated parchment was also inferior after creasing. This indicates the ethylene/vinyloxyethanol copolymer coatings will be particularly suitable for application involving folding, creasing and wear, such as overwrappings for boxes. Other copolymers of the same vinyloxyethanol content but lower molecular weights, e.g., viscosities down to 2500 centipoises (at 125° C.) had somewhat higher moisture transmission rates, but the results on creased samples were comparable with those for polyethylene coated samples. Thus when lower moisture transmission rates are particularly important it will be desirable to employ the somewhat higher molecular weight ethylene/vinyloxyethanol copolymer waxes having melt viscosities in the range of 20,000 to 40,000 or more centipoises at 125° C., although ease of application will often make those in the range of 8000 to 15,000 or 20,000 centipoises more suitable where somewhat higher moisture vapor transmission is acceptable. When extrusion apparatus is available, the higher molecular weight ranges, e.g., in melt indexes of 2 to 10 at 190° C. temperature, can suitably be used. The ethylene/vinyloxyethanol copolymer of 20% vinyloxyethanol content had a higher moisture vapor transmission rate, partially because of its low melt viscosity. This copolymer will often conveniently be used in about a 3,000 to 5,000 centipoise viscosity range, although lower viscosities can be used, depending upon how much toughness of the coating is required, and with paraffin of course values down to 100 centipoises are commonly employed.

*Example 9*

An ethylene/vinyloxyethanol copolymer of 20% vinyloxyethanol content and having a melt viscosity of 3160 centipoises at 125° C., was blended with paraffin wax, the copolymer constituting 25% by weight of the blend and coated on white offset paper by passing between hot rolls at 115° C., and heat sealed at 350° F., to form a laminate which did not delaminate under stresses of 0.30 lb./inch, at which the paper failed and the coating had low moisture vapor transmission properties characteristic of paraffins. The paraffin employed was of melting point 62.5° C., melt viscosity (at 125° C.,) of 3.2., and the blend with the ethylene vinyloxyethanol copolymer had a melt viscosity of 915 at 125° C. The coated paper had good grease resistance as indicated by tests with a 50:50 peanut oil-turpentine mixture in which penetration required more than 4,000 seconds in a drop penetration method, and 46 seconds when tested by float time, compared to 880 seconds and 3.7 seconds for the paraffin itself. The ethylene/vinyloxyethanol copolymer without paraffin is even better in grease resistance.

Various other animal, vegetable and mineral waxes, i.e., natural waxes, can of course be combined with the ethylene/vinyloxyethanol copolymers, those melting in the range of 120 to 200° F. being particularly convenient for use, for example, paraffins and petroleum waxes in general, beeswax, candelilla, ester gums, microcrystalline waxes, and various other natural and synthetic waxes.

*Example 10*

An ethylene/vinyloxyethanol copolymer oil of 50% vinyloxyethanol content was applied to papers for transparentizing purposes by dipping the papers into 5, 10 and 15% by weight solutions of the copolymer. Tests for transparency and opacity indicated the copolymers were useful transparentizing agents, particularly when present in an amount of about 5% by weight of the paper, although lower amounts down to 2% or so and higher amounts can also be used. The 5% amount was non-migratory, exhibiting very little oil leakage, while a 10% amount resulted in some oil leakage. If desired, the transparentizing copolymer can contain even higher amounts of vinyloxyethanol, e.g., 75% or more by weight, although use of such amounts of the relatively expensive monomer is not necessary. The ethylene/vinyloxyethanol copolymer waxes containing 10-20% by weight of vinyloxyethanol can also be employed as transparentizing agents, being applied from a hot xylene solution, followed by heat treating in an oven at 150° C., for five minutes.

What is claimed is:

1. Paper coated with an interpolymer of ethylene and an hydroxyalkyl vinyl ether in which the interpolymer is composed of 2 to 12 molar percent of hydroxyalkyl vinyl ether, has a number average molecular weight of 1000 to 10,000, a 2500 to 40,000 centipoise viscosity at 125° C., and a melting point in the range of 60 to 105° C.

2. The coated paper of claim 1 further defined in that the hydroxyalkyl vinyl ether is vinyloxyethanol and it constitutes 7% to 15% by weight of the interpolymer which has a number average molecular weight of 1000 to 4000.

3. The coated paper of claim 2 further defined in that the interpolymer has a melt viscosity in the range of 3000 to 5000 centipoises at 125° C., and is free from acetal.

4. The coated paper of claim 1 further defined in that the interpolymer has a number average molecular weight of 1000 to 4000, a melt viscosity in the range of 3000 to 5000 and is composed of 3 to 6 molar percent of hydroxyalkyl vinyl ether.

5. Paper coated with a blend of an interpolymer of ethylene and an hydroxyalkyl vinyl ether and a wax in which the interpolymer is composed of 2 to 12 molar percent of hydroxyalkyl vinyl ether, has a number average molecular weight of 1000 to 10,000, a 2500 to 40,000 centipoise visscosity at 125° C., and a melting point in the range of 60 to 105° C., and the wax is a paraffin wax melting in the range of 60 to 120° C., the wax being present in substantial amount up to 25% by weight of the blend.

6. The coated paper of claim 5 further defined in that the hydroxyalkyl vinyl ether is vinyloxyethanol and the interpolymer has a number average molecular weight of 1000 to 4000.

7. The coated paper of claim 6 further defined in that the interpolymer has a melt viscosity in the range of 3000 to 5000 centipoises at 125° C., and is free from acetal.

8. Paper coated with a continuous film of ethylene/ vinyloxyethanol copolymer, the vinyloxyethanol content being 7% to 15% by weight of the copolymer which is of 20,000 to 40,000 centipoise viscosity at 125° C., has a number average molecular weight of 1000 to 10,000 and a melting point in the the range of 60 to 105° C., the coating being present in an amount which is 25% to 75% by weight of the uncoated paper.

References Cited by the Examiner

UNITED STATES PATENTS

| | | | |
|---|---|---|---|
| 3,025,267 | 3/1962 | Calfee | 260—88.1 X |
| 3,197,426 | 7/1965 | Zaayenga | 117—158 X |
| 3,205,186 | 9/1965 | Zaayenga | 117—158 X |

FOREIGN PATENTS 906,989  9/1962  Great Britain.

WILLIAM D. MARTIN, *Primary Examiner.*

H. W. MYLIUS, *Assistant Examiner.*